US010701919B2

(12) United States Patent
Porter

(10) Patent No.: US 10,701,919 B2
(45) Date of Patent: Jul. 7, 2020

(54) CLIP-ON TROLLING DEVICE

(71) Applicant: Michael Porter, Stow, OH (US)

(72) Inventor: Michael Porter, Stow, OH (US)

(*) Notice: Subject to any disclaimer, the term of this patent is extended or adjusted under 35 U.S.C. 154(b) by 166 days.

(21) Appl. No.: 15/461,764

(22) Filed: Mar. 17, 2017

(65) Prior Publication Data
US 2018/0263230 A1    Sep. 20, 2018

(51) Int. Cl.
| A01K 91/03 | (2006.01) |
| A01K 91/08 | (2006.01) |
| A01K 95/00 | (2006.01) |
| A01K 95/02 | (2006.01) |

(52) U.S. Cl.
CPC .............. *A01K 95/02* (2013.01); *A01K 91/03* (2013.01); *A01K 91/08* (2013.01); *A01K 95/00* (2013.01)

(58) Field of Classification Search
CPC ........ A01K 95/00; A01K 95/02; A01K 91/08; A01K 91/03; A01K 91/04
USPC ... 43/43.1, 44.87, 44.9, 44.91, 44.92, 44.93, 43/44.95, 43.12, 43.13
See application file for complete search history.

(56) References Cited

U.S. PATENT DOCUMENTS

| 1,252,621 | A | * | 1/1918 | Smith | ..................... | A01K 91/04 |
| | | | | | | 43/44.85 |
| 1,943,192 | A | | 11/1932 | Semar | | |
| 2,359,588 | A | * | 10/1944 | Shea | ..................... | A01K 95/00 |
| | | | | | | 43/43.12 |
| 2,444,791 | A | * | 7/1948 | Stahnke | ................. | A01K 93/00 |
| | | | | | | 43/44.93 |
| 2,488,475 | A | * | 11/1949 | Merritt | .................. | A01K 95/00 |
| | | | | | | 43/43.12 |
| 2,562,054 | A | * | 7/1951 | Mathieu | ................. | A01K 95/00 |
| | | | | | | 43/43.12 |
| 2,716,832 | A | * | 9/1955 | Minnie, III | ............ | A01K 95/00 |
| | | | | | | 43/43.12 |
| 2,749,650 | A | * | 6/1956 | Rees | ..................... | A01K 97/24 |
| | | | | | | 43/43.12 |

(Continued)

FOREIGN PATENT DOCUMENTS

| CA | 2851630 A1 * | 9/2014 | ............. A01K 95/00 |
| EP | 1358796 A1 * | 11/2003 | ........... A01K 91/047 |

(Continued)

OTHER PUBLICATIONS

Bass Pro Shop. Quick Change Weight Snap. Product for dale by Bass Pro Shops at http://www.basspro.com/Quick-Change-Weight-Snap/product/2252581/.

(Continued)

*Primary Examiner* — Darren W Ark
(74) *Attorney, Agent, or Firm* — Dominic A. Frisina

(57) ABSTRACT

The inventors disclose and teach herein a device that quickly and reliably attaches rigging to a fishing line, especially trolling lines. The device includes a spring-loaded clip with means for attaching additional accessories to the clip, such as weights. Accordingly, in the context of trolling, a trolling depth can be set and readjusted rapidly simply by clipping different weights onto the line. Moreover, the clip includes a side-opening for receiving a fishing line in compression between a spring-loaded plunger and anvil. The line is further secured by an embossed retainer blocking the line from slipping out from between the plunger and anvil.

3 Claims, 7 Drawing Sheets

(56) References Cited

U.S. PATENT DOCUMENTS

| | | | | |
|---|---|---|---|---|
| 2,858,637 | A | * | 11/1958 | Stark .................. A01K 95/00 43/43.12 |
| 3,068,605 | A | * | 12/1962 | Munsinger ............ A01K 91/02 43/42.74 |
| 3,177,606 | A | * | 4/1965 | Benoit .................. A01K 95/00 43/43.12 |
| 3,354,523 | A | * | 11/1967 | Roche .................. A01K 91/04 24/601.8 |
| 3,408,701 | A | * | 11/1968 | Decker ................. A01K 91/03 24/600.9 |
| 3,449,854 | A | * | 6/1969 | Sinclair ................ A01K 91/10 43/43.1 |
| 3,491,477 | A | * | 1/1970 | Karras .................. A01K 91/03 43/44.84 |
| 3,619,932 | A | * | 11/1971 | Maxwell ............... A01K 91/06 43/43.12 |
| 3,710,501 | A | | 1/1973 | Ware, Jr. |
| 3,765,118 | A | | 10/1973 | Reitler |
| 3,816,954 | A | | 6/1974 | Bissonette |
| 3,827,175 | A | * | 8/1974 | Howard ................ A01K 93/00 43/44.95 |
| 3,925,920 | A | * | 12/1975 | Walker ................. A01K 91/08 43/43.12 |
| 3,959,913 | A | * | 6/1976 | Weber .................. A01K 91/08 43/43.12 |
| 3,961,437 | A | | 6/1976 | Lewis |
| 4,205,478 | A | * | 6/1980 | Emory .................. A01K 91/08 43/44.85 |
| 4,248,002 | A | | 2/1981 | McNellis |
| 4,267,659 | A | * | 5/1981 | Grasso .................. A01K 95/00 43/43.12 |
| 4,369,551 | A | * | 1/1983 | Heredia ................ A01K 91/047 24/656 |
| 4,628,630 | A | * | 12/1986 | Bohme .................. A01K 91/08 24/115 M |
| 4,856,224 | A | * | 8/1989 | Fincher, Sr. ........... A01K 91/08 43/43.12 |
| 4,872,281 | A | * | 10/1989 | Burgess ................ A01K 91/08 43/43.12 |
| 4,905,401 | A | * | 3/1990 | Fukumoto ............ A01K 91/08 43/43.12 |
| 5,150,540 | A | * | 9/1992 | Bennett ................ A01K 91/03 43/43.12 |
| 5,177,894 | A | | 1/1993 | Dunsford |
| 5,233,781 | A | * | 8/1993 | Bigelow ............... A01K 93/00 43/17 |
| 5,412,897 | A | | 5/1995 | Smith |
| 5,608,985 | A | * | 3/1997 | Kainec ................. A01K 91/04 43/43.1 |
| 6,021,595 | A | * | 2/2000 | Noel ...................... A01K 85/01 362/34 |
| 6,484,435 | B1 | * | 11/2002 | Mosher ................. A01K 91/06 43/43.1 |
| 6,732,470 | B1 | * | 5/2004 | Bennett ................ A01K 91/04 43/17.2 |
| 7,152,362 | B2 | * | 12/2006 | Holbrook .............. A01K 91/08 43/43.12 |
| 7,197,847 | B2 | | 4/2007 | Albrant, Jr. |
| 7,621,071 | B2 | * | 11/2009 | Brasseur ............... A01K 95/00 43/43.1 |
| 7,832,139 | B1 | * | 11/2010 | Christensen .......... A01K 93/00 24/908 |
| 8,033,044 | B2 | * | 10/2011 | Hails ..................... A01K 93/02 43/17 |
| 8,695,180 | B2 | * | 4/2014 | Delle Donne ........ A01K 91/04 24/580.1 |
| 9,883,664 | B2 | * | 2/2018 | Bos ....................... A01K 91/03 |
| 2005/0028427 | A1 | * | 2/2005 | Fairbrass ............. A01K 91/047 43/43.12 |
| 2006/0248779 | A1 | * | 11/2006 | Settele .................. A01K 95/02 43/43.12 |
| 2006/0265937 | A1 | * | 11/2006 | Randall ................ A01K 85/00 43/43.15 |
| 2007/0140892 | A1 | | 6/2007 | Garcia et al. |
| 2010/0287813 | A1 | * | 11/2010 | Moritz .................. A01K 91/04 43/43.1 |
| 2013/0008075 | A1 | * | 1/2013 | Lindeman ............ A01K 95/02 43/43.12 |
| 2013/0008077 | A1 | * | 1/2013 | Koch-Schmidt ...... A01K 95/02 43/44.87 |
| 2017/0251652 | A1 | * | 9/2017 | Novak .................. A01K 91/053 |

FOREIGN PATENT DOCUMENTS

| | | | | |
|---|---|---|---|---|
| EP | 2599385 | A1 | * | 6/2013 |
| EP | 2829175 | A1 | * | 1/2015 |
| FR | 2444405 | A3 | * | 7/1980 ............ A01K 95/00 |
| GB | 307685 | A | * | 3/1929 ............ A01K 95/00 |
| GB | 683430 | A | * | 11/1952 .......... A01K 95/00 |
| GB | 2155292 | B | * | 7/1988 ............ A01K 93/00 |
| GB | 2345425 | A | * | 7/2000 ........... A01K 91/053 |
| GB | 2357686 | A | * | 7/2001 ............ A01K 91/04 |
| GB | 2373982 | A | * | 10/2002 .......... A01K 95/00 |
| GB | 2363958 | B | * | 9/2004 ............ A01K 95/02 |
| GB | 2408906 | A | * | 6/2005 ............ A01K 95/02 |
| GB | 2421162 | A | * | 6/2006 ............ A01K 95/02 |
| GB | 2426681 | A | * | 12/2006 .......... A01K 95/02 |
| GB | 2451361 | A | * | 1/2009 ........... A01K 91/047 |
| GB | 2508254 | B | * | 4/2015 |
| GB | 2508032 | B | * | 2/2016 ........... A01K 91/047 |
| KR | 20040064251 | A | * | 7/2004 |
| KR | 20090000783 | U | * | 1/2009 |
| KR | 20130107666 | A | * | 10/2013 |
| WO | WO-9012499 | A1 | * | 11/1990 ........... A01K 91/08 |
| WO | WO-2011087427 | A1 | * | 7/2011 ............ A01K 95/02 |

OTHER PUBLICATIONS

Cabelas. Advanced Anglers Snap Weights. Product for sale by Cabel's at http://www.cabelas.com/product/CABELAS-ADVANCED-ANGLERS-SNAP-WEIGHTS-PER/1807045.uts.

Franks Great Outdoors. Off Shore Tackle Snap Weight System. Product for sale by Franks Great Outdoors at https://www.franksgreatoutdoors.com/off-shore-tackle-snap-weight-system.html?fee=6&fep=27004&gclid=CNnyhtH_ydlCFdG2wAodsVkFZw.

* cited by examiner

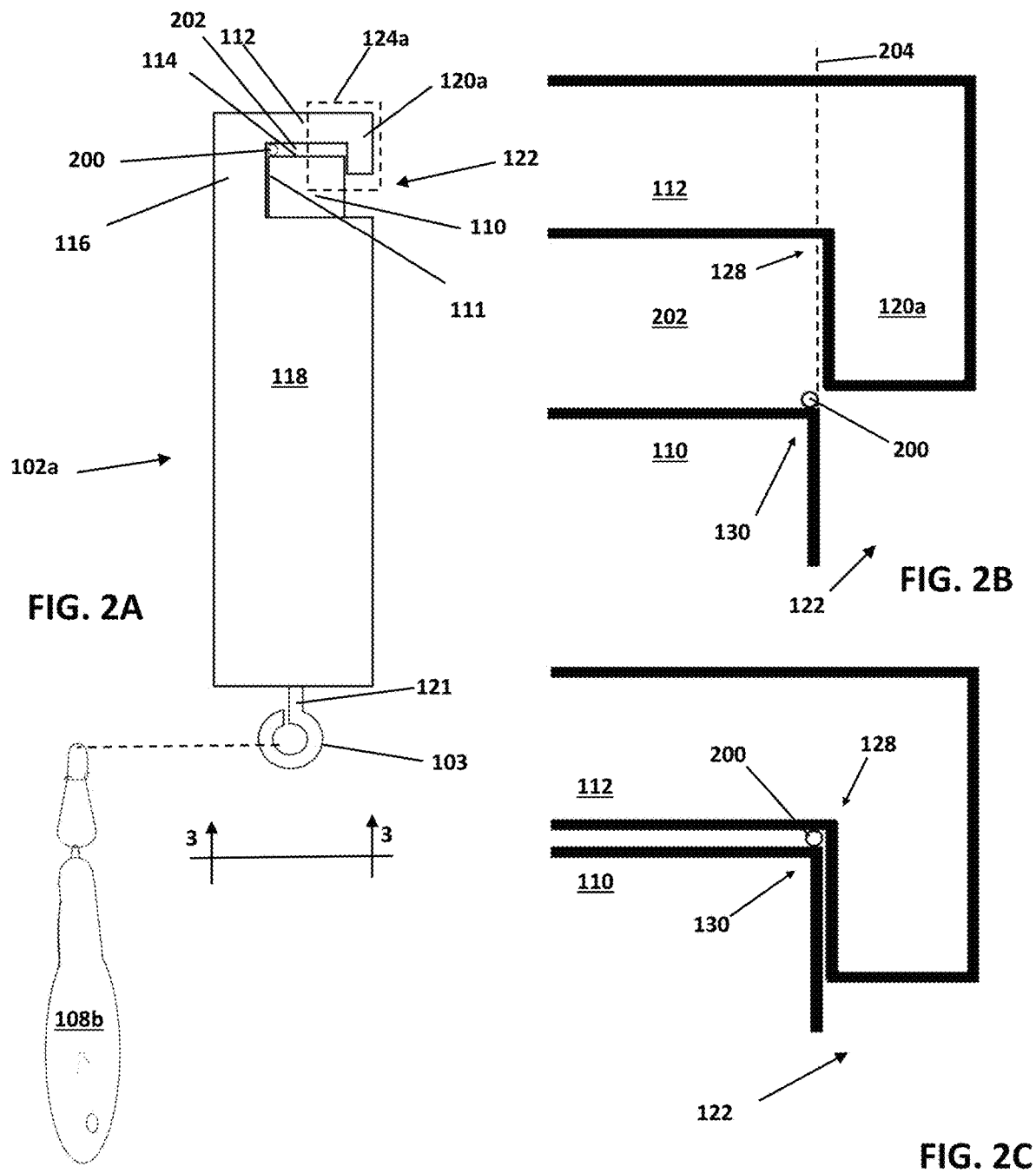

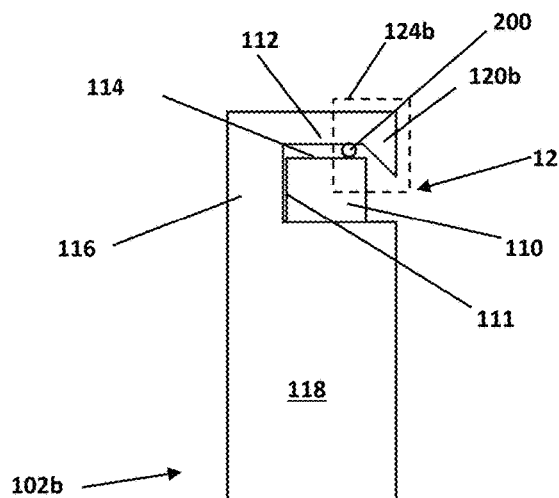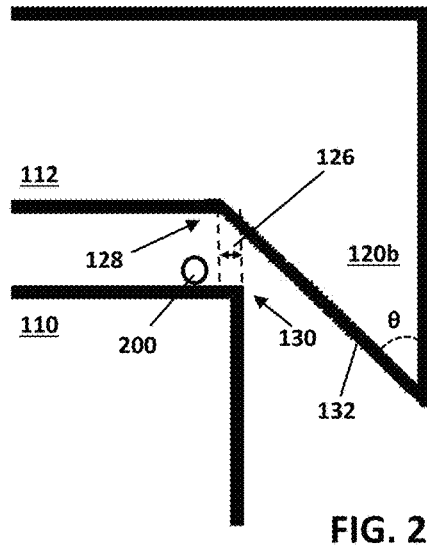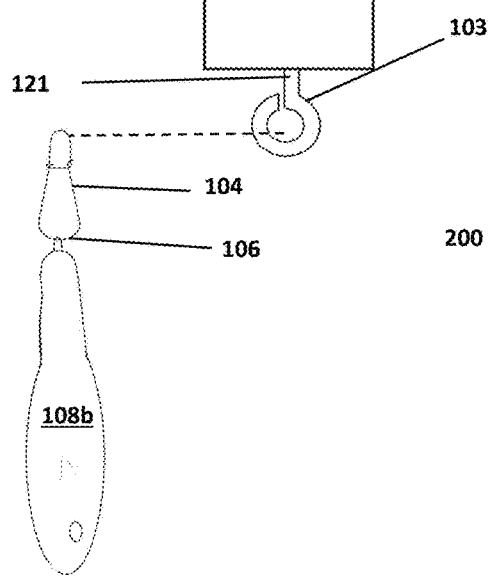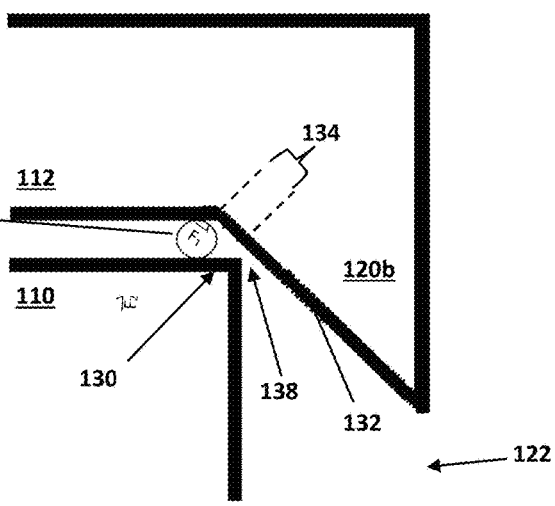
FIG. 2D
FIG. 2E
FIG. 2F

CLIP-ON TROLLING DEVICE

I. BACKGROUND OF THE INVENTION

A. Field of Invention

Embodiments of the invention may generally relate to fishing tackle especially in the field of trolling.

B. Description of the Related Art

Downrigger weights are well known in the field of fishing in general, and trolling in particular. However, known downrigger weights have certain disadvantages. For instance, downriggers tend to be cumbersome to assemble and install. Many require tying tedious knots in order to affix a weight to a fishing line, and may require cutting the line in order to change out weights. Thus changing weights can be time consuming. Other downriggers may be prone to loss in conditions where debris or aquatic plant life may be crowded below the surface creating snags. What is missing from the art is a trolling weight that can be securely clipped onto a fishing line, and resists being pulled off of the line without having to tie fishing line to the weight or wind fishing line around it.

Some embodiments of the present invention may provide one or more benefits or advantages over the prior art.

II. SUMMARY OF THE INVENTION

Embodiments of the invention may be directed to downrigger weights that permit a fisherman to troll at selected depths by quickly and securely changing out weights. The weights may, for instance, be clipped to the fishing line and may not require tying the weights to the line. Furthermore, embodiments may be specially designed to resist being pulled off of the fishing line. Adaptations for resisting being pulled off include embossed line retainers that effectively box-in or retainably enclose the fishing line.

Some embodiments may relate to a clip-on trolling device, comprising a plunger having a shaft end and a line-pad end opposing the shaft end; a chassis having interior walls defining a central lumen, the central lumen receiving the plunger in a loose running fit; a plunger opening in the chassis communicating with the central lumen and receiving the plunger in a loose running fit, the plunger being extendable therethrough; an anvil opposing the plunger; a riser connecting one end of the anvil to the chassis, wherein the riser is flush with the plunger in a slideable relation; a line retainer member embossed on an end of the anvil opposing the riser, wherein the line retainer member cooperates with the plunger to define a loose running fit therebetween adapted to retainably enclose a fishing line; a shaft connecting to the shaft end of the plunger and extending through the central lumen of the chassis and through a shaft opening at an end of the chassis opposing the plunger opening; an eyelet at an end of the shaft opposing the plunger; and a coil spring coaxial with the shaft and applying spring force simultaneously to the plunger and to an interior wall of the chassis at an end of the chassis distal to the plunger, wherein the coil spring biases the plunger against the anvil.

Embodiments may relate to a clip-on trolling device, comprising: a plunger having a shaft end and a line-pad end opposing the shaft end; a chassis having interior walls defining a central lumen, the central lumen receiving the plunger in a slideable relation; a plunger opening in the chassis communicating with the central lumen, the plunger being extendable therethrough in a slideable relation; an anvil opposing the line-pad end of the plunger; a riser connecting one end of the anvil to the chassis, wherein the riser is flush with the plunger in a slideable relation; a line retainer member embossed on an end of the anvil opposing the riser, wherein the line retainer member cooperates with the plunger to define in a slideable relation therebetween adapted to retainably enclose a fishing line; a shaft connecting to the shaft end of the plunger and extending through the central lumen of the chassis and through a shaft opening at an end of the chassis opposing the plunger opening; and a spring biasing the plunger against the anvil.

Other benefits and advantages will become apparent to those skilled in the art to which it pertains upon reading and understanding of the following detailed specification.

III. BRIEF DESCRIPTION OF THE DRAWINGS

The invention may take physical form in certain parts and arrangement of parts, embodiments of which will be described in detail in this specification and illustrated in the accompanying drawings which form a part hereof, wherein like reference numerals indicate like structure, and wherein:

FIG. 2A is a side view of an embodiment showing a rectangular retainer;

FIG. 2B is a magnified view of area 124a of FIG. 2A where the plunger is drawn back;

FIG. 2C is a magnified view of area 124a of FIG. 2A where the plunger contacts the retainer;

FIG. 2D is a side view of an embodiment showing a chamfered retainer;

FIG. 2E is a magnified view of area 124a of FIG. 2D where the plunger is drawn back;

FIG. 2F is a magnified view of area 124a of FIG. 2D where the plunger contacts the retainer;

IV. DETAILED DESCRIPTION OF THE INVENTION

As used herein the terms "embodiment", "embodiments", "some embodiments", "other embodiments" and so on are not exclusive of one another. Except where there is an explicit statement to the contrary, all descriptions of the features and elements of the various embodiments disclosed herein may be combined in all operable combinations thereof.

Language used herein to describe process steps may include words such as "then" which suggest an order of operations; however, one skilled in the art will appreciate that the use of such terms is often a matter of convenience and does not necessarily limit the process being described to a particular order of steps.

Conjunctions and combinations of conjunctions (e.g. "and/or") are used herein when reciting elements and characteristics of embodiments; however, unless specifically stated to the contrary or required by context, "and", "or" and "and/or" are interchangeable and do not necessarily require every element of a list or only one element of a list to the exclusion of others.

Figure 1:
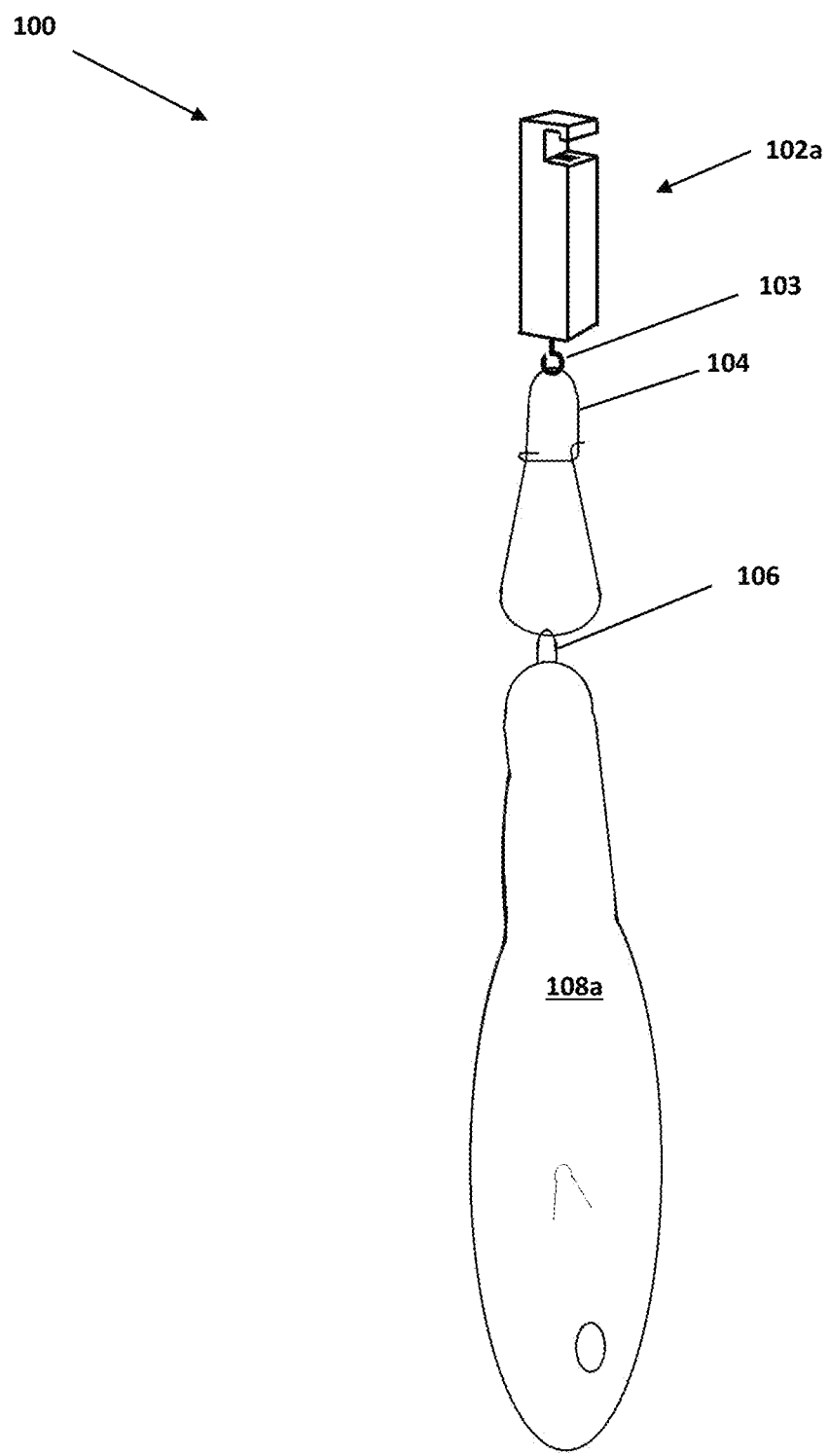
FIG. 1 is a perspective view of an embodiment having a fish-shaped weight clipped to one end.

Referring now to the drawings wherein the showings are for purposes of illustrating embodiments of the invention only and not for purposes of limiting the same, FIG. 1 is a perspective view of an embodiment 100 including a clip 102a having a weight 108a installed. The clip 102a includes an eyelet 103 which is adapted to receive a double-locking snap 104 linking the clip 102a to a loop 106 embedded in the weight 108a. The skilled artisan will readily appreciate that the invention is not limited to double locking snaps, or particular weights. Rather, the skilled artisan will understand that other structure for attaching weights to the eyelet 103 are within the scope of the invention, as are any of a wide variety of well-known weights including, without limitation, common sinkers.

FIG. 2A is a side view of the embodiment shown in FIG. 1, but blown up to show more detail. Additionally, the weight 108b is smaller (lighter) than that of FIG. 1 and is shown detached and separated from the eyelet 103.

With continuing reference to FIG. 2A, the plunger 110 of clip 102a is shown protruding from a chassis 118. An anvil 112 is shown in a position opposing the plunger 110, so that the plunger 110 and anvil 112 are adapted to cooperate to grip fishing line 200 therebetween in a spring-loaded relationship. The plunger 110 is partially drawn back from the anvil 112 by drawing back shaft 121. This creates a gap 202 between the anvil 112 and a line pad 114. The line pad 114 is a gripping surface of the plunger 110. Line pads and/or anvils according to embodiments of the invention may include knurling or other texturing to improve grip; however, such texturing is optional and not required.

With still further reference to FIG. 2A, anvil 112 is connected to the chassis 118 through a riser 116. Plunger 110 is shown flush 111 against riser 116, but it will be understood that the relation between the riser 116 and the plunger 110 is slideable. This flush but slideable arrangement of riser 116 and plunger 110 prevents fishing line 200 from falling between these two structures, which would result in clip 102a failing to grip the line 200 and may cause the plunger 110 to seize. The anvil 112 also includes an embossed line retainer 120a structure that is adapted to prevent fishing line 200 from slipping out of the side opening 122. As shown in the drawings side opening 122 is defined by the gap between a lower edge of the embossed line retainer 120a and an upper edge of the chassis 118.

FIGS. 2B and 2C are blow-up views of the structure in box 124a of FIG. 2A. In FIG. 2B the plunger 110 is drawn back from the anvil 112 and retainer 120a so that the line 200 can be inserted or removed through side opening 122. As shown, an outside corner 130 of the plunger 110 is aligned with an inside corner 128 of the anvil 112 and retainer 120a along axis 204. The outside corner 130 is thus receivable by the inside corner 128 as the plunger 110 contacts the anvil 112. The plunger 110 is shown in a flush but slideable relation with the retainer 120a comprising a loose running fit that permits movement of the plunger 110 relative to the retainer 120a without permitting fishing line 120 to slip through a gap between them. As shown in FIG. 2C when the plunger 110 holds a line 200 in compression between itself and the anvil 112, the space between the retainer 120a and the plunger 110 is much smaller than the diameter of the line 200 such that the line 200 is locked in the space between the plunger 110 and anvil 112 and is blocked from exiting through the side opening 122. Thus, the line is retainably enclosed by the foregoing adaptations.

Turning to FIG. 2D, similar to clip 102a, clip 102b includes a plunger 110 housed in a chassis 118 and biased against an anvil 112. The anvil 112 is connected to the chassis 118 through a riser 116, and the riser 116 and plunger 110 are engaged in a flush but slideable 111 loose running fit. The fit between the riser 116 and the plunger 110 is tight enough to prevent fishing line from slipping therebetween, but loose enough to permit easy sliding of the plunger 110 against the riser 116. Unlike clip 102a, FIGS. 2D through 2F illustrate a clip embodiment 102b where an outside corner 130 of the plunger 110 is laterally offset 126 from an inside corner 128 of the retainer 120b. Accordingly, when the plunger 110 is released, as shown in FIG. 2F, the corner 130 of the plunger 110 approaches inside chamfered surface 132, effectively creating a sidewall 134 that boxes in a fishing line 200. While the riser 116 is not shown in FIGS. 2E and 2F it will be understood that it is present and thus forms a closed, or effectively closed, box around fishing line 200. This feature prevents the clip 102b from being lost if the fishing line 200 were to slip between the plunger 110 and anvil 112. It will be understood to the ordinarily skilled artisan that offset 126 is not drawn to scale and is exaggerated for the sake of illustration. Similarly, while the angle θ of the chamfer is roughly drawn to about 45 degrees, the particular angle can vary significantly from one embodiment to the next without departing from the scope of the invention as will be readily apparent to the ordinarily skilled artisan.

With continuing reference to FIGS. 2D-2F, the proper amount of offset 126 of clip 102b is that which is minimally necessary to form sidewall 134. As a practical matter, a functional offset 126 would create a gap 138 between outside corner 130 and inside chamfered surface 132 smaller than the diameter of the fishing line 200 when the fishing line is held between the anvil 112 and plunger 110. Accordingly, in order to pass through the gap 138 a fishing line 200 held between the plunger 110 and anvil 112 must either elastically deform in the nature of a snap fit, or overcome the force $F_2$ generated by a spring biasing the plunger 110 against the anvil 112. Thus, embodiments may have a spring force ($F_2$) that is calculated not to be overcome by the pulling force ($F_1$) required to pull line 200 through gap 138. The forces $F_1$ and $F_2$ are shown in FIG. 2F in vector notation pointing in the direction of the respective forces. Embodiments may have a spring force $F_2$ that is not overcome by the pulling force $F_1$ required to draw a fishing line 200 through gap 138, but the spring force $F_2$ may be limited so that it is not so excessive as to cause discomfort to a user while drawing back the plunger 110. The ordinarily skilled artisan would be capable of using the teachings contained herein regarding offset 126 to optimize the size of gap 138 and the magnitude of spring force $F_2$.

With reference to FIG. 2A, FIG. 2F, and FIG. 1 simultaneously, it is contemplated that an advantage of the invention as shown in the illustrated embodiments is that the invention is very securely attached to fishing line 200. The quality of attachment by embodiments of the invention is improved in part through having a side-opening 122 that is roughly 90 degrees to any forces applied to the embodiment by the fishing line during normal trolling operations, rather than a top opening in line with said applied forces. If the attached weight 108 hits a snag, and/or if the user fights a large fish, the applied forces tend to be against the anvil 112 of the invention, which is a strong point, rather than against the retainer 120 toward the side opening 122, which is a relatively weak point.

Figures 3A, 3B:
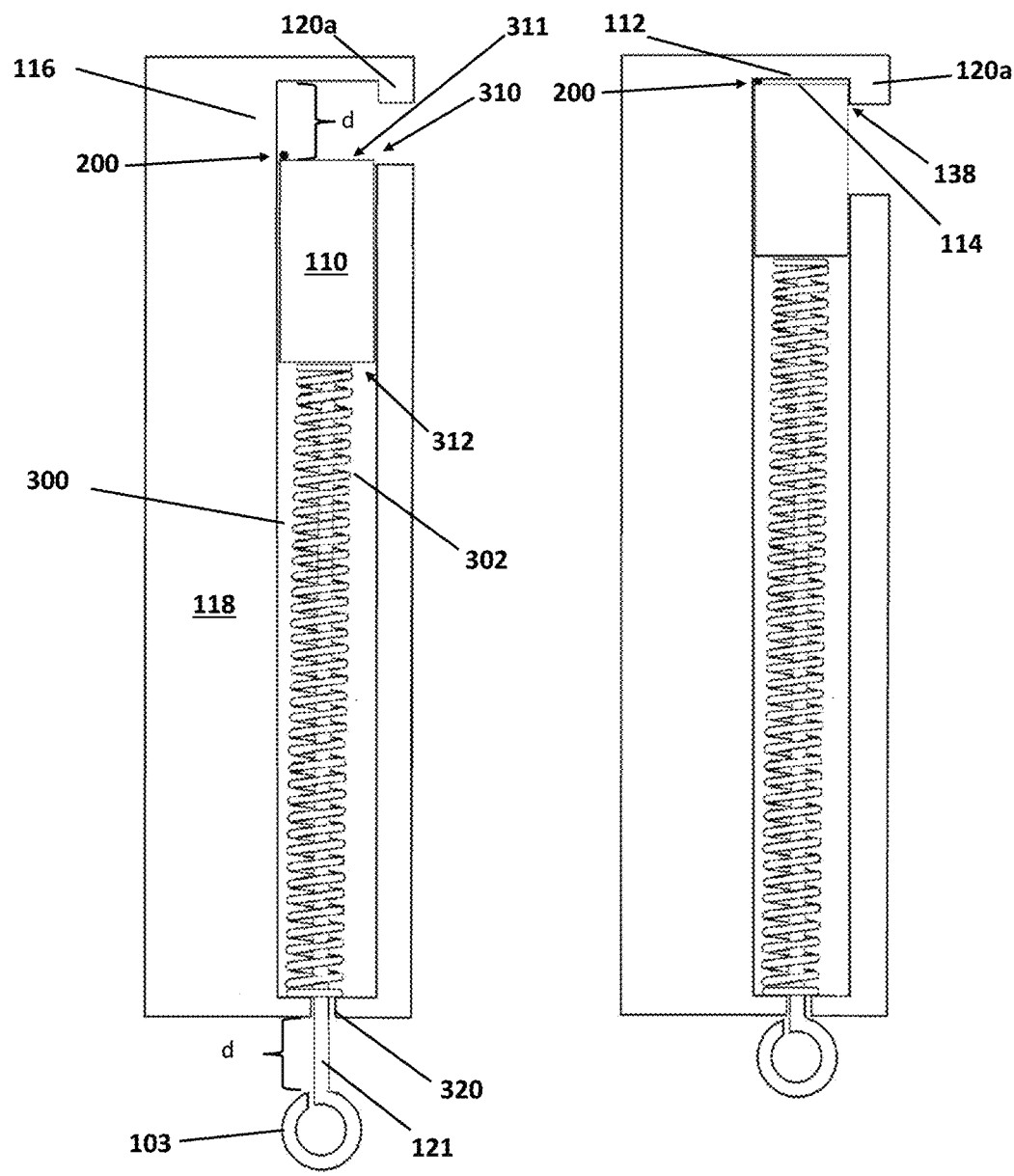
FIG. 3A is a side cross sectional view of an embodiment where the plunger is drawn back, opening the clip an enabling a fishing line to be inserted.
FIG. 3B is a side cross sectional view of the embodiment of FIG. 3A where the plunger is engaging the anvil and gripping a fishing line.

FIGS. 3A and 3B are cross-sectional views of a clip 102*a*, taken along line 3-3 of FIG. 2A. According to the illustrated embodiment, the clip 102*a* has internal structures including a central lumen 300 housing a plunger assembly. The plunger assembly includes a plunger 110 having a shaft 121 attached to a shaft end 312 of the plunger 110, and a coil spring 302 coaxially disposed on the shaft 121. The line pad end 311 of the plunger 110 is shown extending through a plunger opening 310 in a slideable relation with the lumen 300 and the plunger opening 310. Slideable relations within the scope of the invention include, without limitation, a loose running fit. The shaft 121 is shown extending through the lumen 300 and through a shaft opening 320 of an interior wall of the chassis 118 terminating in an eyelet 103. In FIG. 3A particularly, the plunger 110 is shown drawn back from the anvil 112 by a distance "d" thus partially compressing coil spring 302.

In FIG. 3B the plunger 110 is shown gripping a fishing line 200 between the line pad 114 and anvil 112, while leaving a gap 138 smaller than the diameter of the fishing line 200 between the plunger and retainer 120*a*, and also between the plunger 110 and the riser 116. The coil spring 302 is shown in contact with the plunger 110 at one end, and at the end distal to the plunger 110 the coil spring 302 is shown in contact with an interior wall of the chassis 118 near the shaft opening 320. According to one embodiment, the coil spring 302 is approximately 98.5% relaxed +/−1%. As shown in FIGS. 3A and 3B, the interior wall of the chassis may be unitary with the chassis. As used herein the term unitary means that the interior wall was made with the chassis in the nature of a continuous part, e.g. from the same mold, rather than being made separate from the chassis and bonded thereto.

Figure 4A:
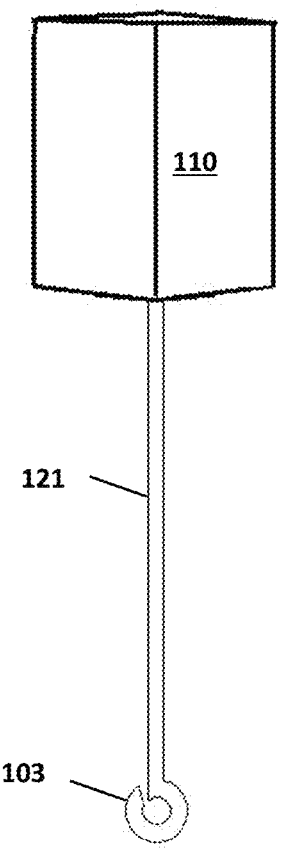
FIG. 4A is a side perspective view of a plunger assembly including a shaft and eyelet.
Figure 4B:
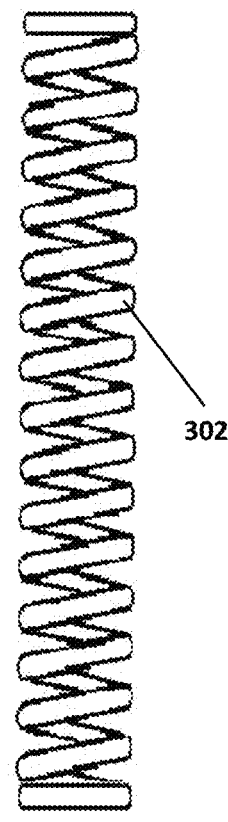
FIG. 4B is a side view of a coil spring suitable for use in combination with the structure of FIG. 4A.
Figure 4C:
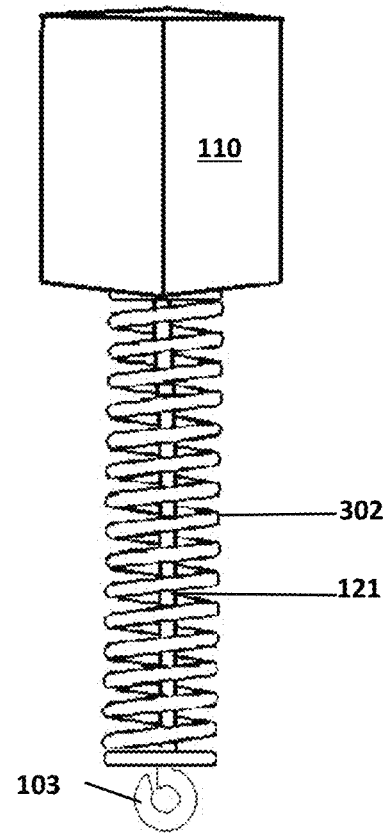
FIG. 4C is a side view of an assembly of the structures of FIGS. 4A and 4B.

FIGS. 4A, 4B, and 4C collectively illustrate a version of the plunger assembly. As shown, this assembly may include a plunger 110, a shaft 121 attached to an end of the plunger 110, an eyelet 103 terminating the opposing end of the shaft 121, and a coil spring 302 coaxial with the shaft 121. FIG. 4C illustrates that the spring 302 is partially compressed between the plunger 110 and eyelet 103; however, the degree of compression is exaggerated for the sake of illustration. Upon installation in a chassis 118 the assembly, as drawn in FIGS. 4A-4C, would receive a wall of the chassis 118 interposed between the spring 302 and the eyelet 103.

Figures 5A, 5B:
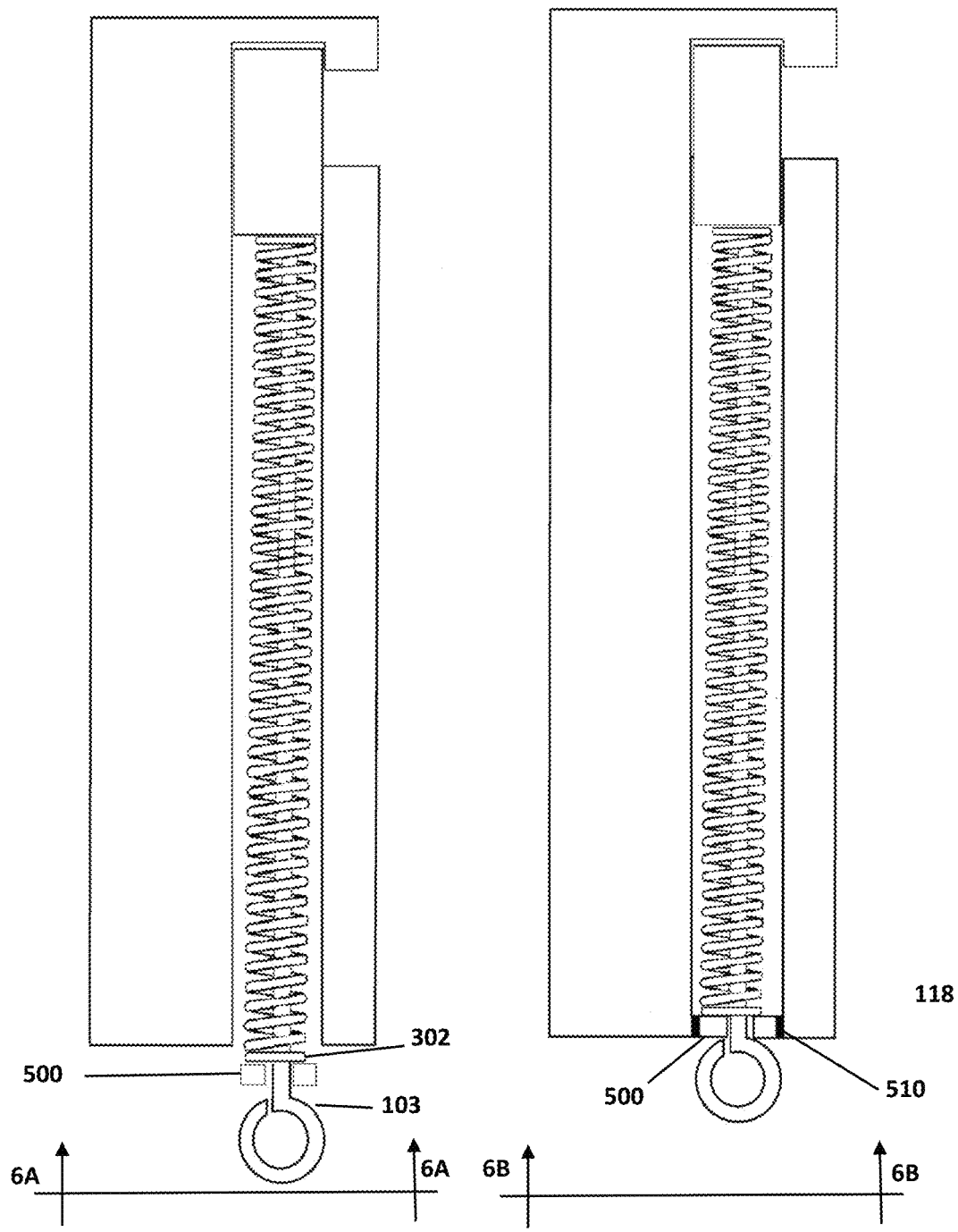
FIG. 5A is a side cross-sectional view of an embodiment that includes a plug at one end permitting insertion of a plunger assembly.
FIG. 5B is a side cross-sectional view of the embodiment of FIG. 5A where the plug is inserted in the chassis and bonded thereto.

Alternatively, FIGS. 5A and 5B illustrate that a plug 500 may be incorporated into the plunger assembly interposed between the spring 302 and eyelet 103. In this embodiment the plug may be bonded to the chassis 118 with, for example and without limitation, an epoxy bead 510 placed in the space between the chassis 118 and plug 500. The structures of FIGS. 5A and 5B are shown in FIGS. 6A and 6B from the perspective indicated by lines 6A-6A and 6B-6B.

Figures 6A, 6B:
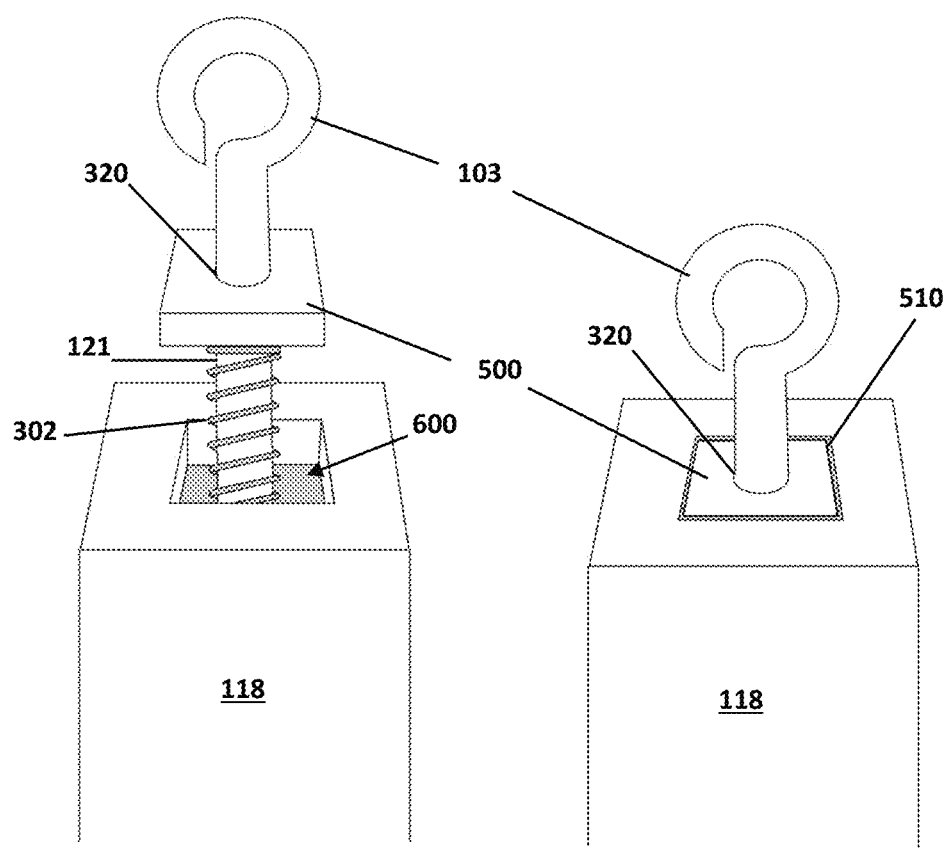
FIG. 6A is a view of the embodiment shown in FIG. 5A taken along line 6A-6A.
FIG. 6B is a view of the embodiment shown in FIG. 5B taken along line 6B-6B.

More specifically, a plug 500 is shown inserted into an opening 600 in a chassis 118 in FIG. 6A, and withdrawn from the opening 600 in FIG. 6B. With particular reference to FIG. 6B, the eyelet 103 is shown at an end of the shaft 121, and the shaft passes through a shaft opening 320 in the plug 500. The coil spring 302 is shown coaxially installed on the shaft 121. In contrast, FIG. 6A shows the assembly installed in a chassis 118 and bonded thereto with, for instance and without limitation, an epoxy bead 510. The skilled artisan will readily appreciate that any of numerous well known bonding methods may be used instead of an epoxy including other curable polymers, adhesives, welding, and the like. In some embodiments, the plug 500 may even be removable, and may thus be held in place with a snap fit, screw fit, or by one or more fasteners.

It is particularly important to trolling fishermen to know the depth of their bait. Depth is known to be a function of weight attached to the line and the speed at which the troller is moving. Heavier weights and slower speeds promote deeper trolling depths, and lighter weights and faster speeds tend to promote shallower trolling depths. Furthermore, one may chart bait depths as a function of sinker weight and trolling speed in a conveniently readable form. Accordingly, embodiments of the invention permit a troller to know his bait depth and quickly change depth by adjusting speed and/or rapidly changing out heavier or lighter weights by simply clipping and unclipping predetermined weights.

It will be apparent to those skilled in the art that the above methods and apparatuses may be changed or modified without departing from the general scope of the invention. The invention is intended to include all such modifications and alterations insofar as they come within the scope of the appended claims or the equivalents thereof.

I claim:

1. A clip-on trolling device, comprising:
    a plunger having a shaft end and a line-pad end opposing the shaft end;
    a chassis having interior walls defining a central lumen, the central lumen receiving the plunger in a slideable relation;
    a plunger opening in the chassis communicating with the central lumen, the plunger being extendable therethrough in a slideable relation;
    an anvil opposing the line-pad end of the plunger;
    a riser connecting one end of the anvil to the chassis, wherein the riser is flush with the plunger in a slideable relation;
    a line retainer member embossed on an end of the anvil opposing the riser, wherein the line retainer member cooperates with the plunger to define a slideable relation therebetween adapted to retainably enclose a fishing line, wherein an inside surface of the line retainer member forms an obtuse inside corner with the anvil, and wherein an outside corner of the plunger is laterally offset from the inside corner of the line retainer member and anvil such that the outside corner of the plunger approaches the inside surface of the line retainer member creating a sidewall adapted to retain a fishing line; and
    a spring biasing the plunger against the anvil.

2. A clip-on trolling device, comprising:
    a plunger having a shaft end and a line-pad end opposing the shaft end;
    a chassis having interior walls defining a central lumen, the central lumen receiving the plunger in a slideable relation;
    a plunger opening in the chassis communicating with the central lumen, the plunger being extendable therethrough in a slideable relation;

an anvil opposing the line-pad end of the plunger;

a riser connecting one end of the anvil to the chassis, wherein the riser is flush with the plunger in a slideable relation;

a line retainer member embossed on an end of the anvil opposing the riser, wherein the line retainer member cooperates with the plunger to define a slideable relation therebetween adapted to retainably enclose a fishing line, wherein an inside surface of the line retainer member forms an obtuse inside corner with the anvil, and wherein an outside corner of the plunger is laterally offset from the inside corner of the line retainer member and anvil such that the outside corner of the plunger approaches the inside surface of the line retainer member creating a sidewall adapted to retain a fishing line;

a shaft connecting to the shaft end of the plunger and extending through the central lumen of the chassis and through a shaft opening at an end of the chassis opposing the plunger opening; and a spring biasing the plunger against the anvil.

3. A clip-on trolling device, comprising:

a plunger having a shaft end and a line-pad end opposing the shaft end;

a chassis having interior walls defining a central lumen, the central lumen receiving the plunger in a loose running fit;

a plunger opening in the chassis communicating with the central lumen and receiving the plunger in a loose running fit, the plunger being extendable therethrough;

an anvil opposing the plunger;

a riser connecting one end of the anvil to the chassis, wherein the riser is flush with the plunger in a slideable relation;

a line retainer member embossed on an end of the anvil opposing the riser, wherein the line retainer member cooperates with the plunger to define a loose running fit therebetween adapted to retainably enclose a fishing line, wherein an inside surface of the line retainer member forms an obtuse inside corner with the anvil, and wherein an outside corner of the plunger is laterally offset from the inside corner of the line retainer member and anvil such that the outside corner of the plunger approaches the inside surface of the line retainer member creating a sidewall adapted to retain a fishing line;

a shaft connecting to the shaft end of the plunger and extending through the central lumen of the chassis and through a shaft opening at an end of the chassis opposing the plunger opening;

an eyelet at an end of the shaft opposing the plunger; and a coil spring coaxial with the shaft and applying spring force simultaneously to the plunger and to an interior wall of the chassis at an end of the chassis distal to the plunger, wherein the coil spring biases the plunger against the anvil.

* * * * *